May 17, 1927.  
C. DREXLER  
1,629,098  
SPRING CLUTCH  
Filed Aug. 22, 1925

INVENTOR.  
CHARLES DREXLER,  
BY  
ATTORNEY.

Patented May 17, 1927.

1,629,098

UNITED STATES PATENT OFFICE.

CHARLES DREXLER, OF INDIANAPOLIS, INDIANA, ASSIGNOR TO L. G. S. DEVICES CORPORATION, OF INDIANAPOLIS, INDIANA, A CORPORATION OF INDIANA.

SPRING CLUTCH.

Application filed August 22, 1925. Serial No. 51,730.

It is the object of my invention to produce a clutch for operatively connecting two relatively rotatable members, which clutch will permit free relative rotation of the members in one direction under all conditions and will permit relative rotation in the other direction after a predetermined maximum torque has been exceeded while operating the clutch the two members together for rotation in the latter direction for torques less than such maximum. A further object of my invention is to provide means for varying the maximum torque which my clutch is capable of transmitting.

I accomplish the above objects by providing one of the rotatable members with an axial circular recess adapted to receive a coil spring which has when unstressed an external diameter slightly larger than the diameter of the recess in order that it will bear against the recess walls when in place; I provide means for operatively connecting one end of this coil spring to the other rotatable member; and I provide means for applying a controlled axial pressure to the spring.

Figure 1:
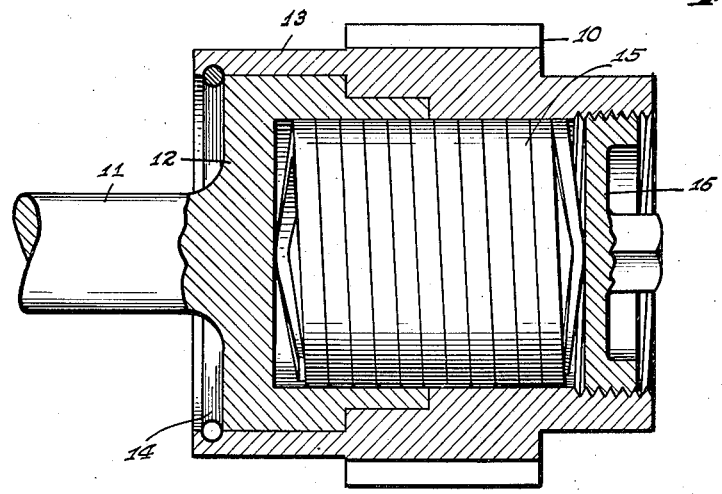
Figure 2:
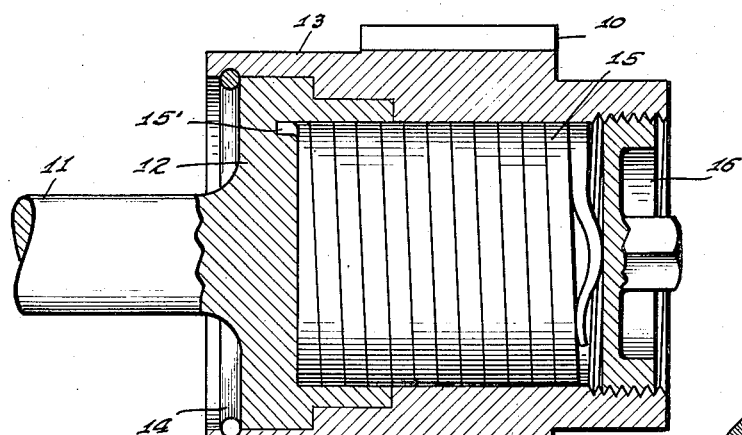
Figure 3:
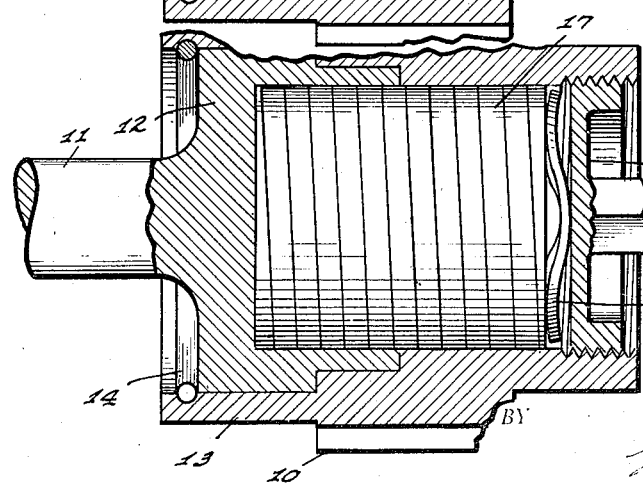
Figure 4:
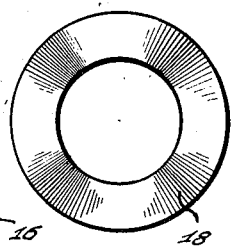

The accompanying drawing illustrates my invention: Fig. 1 is a longitudinal central section through a clutch embodying my invention, the coil spring being connected to the two rotatable members solely by frictional contact with the walls of axial recesses located in such members; Fig. 2 is a modification of the device illustrated in Fig. 1 in which the coil spring is positively connected to one of the rotatable members; Fig. 3 is a further modification which may be adapted to either of the devices shown in Figs. 1 and 2; and Fig. 4 is a plan view illustrating the spring-washer employed in the construction shown in Fig. 3.

I have illustrated my invention as connecting a gear 10 with a shaft 11, but it will be obvious that any two relatively rotatable, co-axial members may be connected together by the same means. The end of the shaft 11 is enlarged to form a cup 12 which is received within the hub 13 of the gear 10, such hub being counterbored for this purpose. Except for this counterbored portion, the bore of the hub 13 has a diameter substantially the same as the interior diameter of the cup 12. The hub 13 extends beyond the cup 12 and is provided interiorly with an annular groove adapted to receive a split spring ring 14 which bears against the back of the cup 12 and prevents relative axial movement of cup and gear.

Located within the bore of the gear 10 and extending into the interior of the cup 12 is a coil spring 15. This spring 15, when not subjected to any stresses has a normal external diameter slightly larger than the diameter of the bore of the hub 10. Thus, the spring when in place in the hub 13 and cup 12 is contracted slightly and exerts an outward pressure against the inner walls of the hub and cup. A portion of the last turn of the spring 15 at each end thereof is displaced axially outward, one such displaced end bearing against the bottom of the cup 12 and the other bearing against a plug 16 screw threadedly mounted in the bore of the hub 13.

It will be evident that when the gear 10 and shaft 11 rotate relatively in a direction to wind the spring 15 the spring 15 will recede from the walls of the two rotating parts and will permit free rotation. If the gear and shaft tend to rotate relatively in a direction causing the spring to unwind, the spring expands into firm contact with its associated parts and clutches them together. This clutching action of the spring 15 enables it to transmit torques between the gear 10 and shaft 11 up to a certain maximum, beyond which the spring will slip. I have found that this maximum torque can be varied by controlling the axial pressure exerted by the spring when one end of the spring is in contact with one rotating part and the other end of the spring is in contact with the other rotating part. Varying this axial pressure causes a corresponding variation in the tendency of the spring to unwind when the gear 10 and shaft 11 tend to rotate in a direction which would unwind the spring. Thus, adjustment of the plug 16 will vary the maximum torque which the spring can transmit.

In the device illustrated in Fig. 2, the parts of the device are substantially the same as the correspondingly numbered parts shown in Fig. 1 except for the fact that the cup 12 is shallower and is provided with a notch for the reception of the outwardly turned end 15' of the spring 15. By this arrangement, the spring 15 is positively connected to the shaft 11. It is therefore unnecessary to depend entirely upon frictional contact between the spring and the inner walls of the cup 12 to insure that the spring and cup are operatively engaged, and the cup can therefore be made shallower and axial space conserved.

In the modification of my device illustrated in Figs. 3 and 4, the parts with the exception of the spring are substantially the same as those illustrated in Fig. 1. Instead of having outwardly displaced ends, the spring 17 in Fig. 3 is close-wound throughout its entire length, and between the end of the spring and the plug 16 is inserted an axially collapsible spring washer 18 which serves substantially the same purpose as the outwardly displaced spring turns of the devices shown in Figs. 1 and 2. Adjustment of the plug 16 varies the axial pressure exerted on the spring and produces a corresponding variation in the maximum torque which the spring can transmit between the gear 10 and shaft 11. Obviously, the spring washer 18 can be located at either end of the spring 17, or at both ends.

As stated above, the spring is usually made so that its normal diameter is slightly larger than the recesses; but this is not necessary, for the spring can be smaller than the recesses and the friction of the spring-ends will cause it to expand into contact with the recess walls when the gear and shaft are rotated relatively in a direction to unwind the spring. The relatively greater pressure exerted by the spring-ends on the gear and shaft insures that the entire exterior surface of the spring will grip the recess walls.

I am aware that means have heretofore been provided for varying the axial pressure on the spring in clutches of this type, one such construction being shown in the copending application of William Carleton Starkey, Serial No. 30,763, filed May 16, 1925. In such devices, however, the spring has been open-wound throughout its entire length, and axial pressure served to compress it axially and to increase directly its normal diameter and the radial pressure it exerted on the walls of its associated recesses. My device differs from this in that axial pressure does not directly increase the radial pressure exerted by the spring, such increase in radial pressure occurring only upon relative rotation of the two members as a result of the friction between the spring ends and the bottoms of the recesses. With my spring, axial pressure does not affect the normal external diameter of the spring— i. e., its external diameter when it is not subjected to any stress as the spring, when not subjected to axial pressure, has its turns in contact except for the axially displaced portions at the spring-ends. Axial pressure, therefore, on the spring cannot collapse the body thereof, and therefore the diameter of the body is unaffected by axial pressure.

I claim as my invention:—

1. In combination, two relatively rotatable members, one of said parts being provided with a central circular recess, a coil spring located in such recess and operatively connected to the other of said rotatable members, so that when said two members tend to rotate relatively in a direction to unwind said spring said spring will tend to expand, at least the majority of the turns of said coil spring being in contact with adjacent turns, axially collapsible resilient means located at one end of said spring, and means for applying axial pressure to said spring through said resilient means.

2. In combination, two relatively rotatable members, alined circular recesses in said members, a coil spring located in said recesses and adapted to engage the walls thereof, so that when said two members tend to rotate relatively in a direction to unwind said spring said spring will tend to expand, at least the majority of the turns of said coil spring being in contact with adjacent turns, axially collapsible resilient means located at one end of said spring, and means for applying axial pressure to said spring through said resilient means.

3. In combination, two relatively rotatable members, one of said parts being provided with a central circular recess, a coil spring located in such recess and operatively connected to the other of said rotatable members, so that when said two members tend to rotate relatively in a direction to unwind said spring said spring will tend to expand, and means for applying axial pressure to said spring, said spring being arranged to retain a substantially constant normal external diameter under variation in axial pressure.

4. In combination, two relatively rotatable members, alined circular recesses in said members, a coil spring located in said recesses and adapted to engage the walls thereof, so that when said two members tend to rotate relatively in a direction to unwind said spring said spring will tend to expand, and means for applying axial pressure to said spring, said spring being arranged to retain a substantially constant normal external diameter under variations in axial pressure.

In witness whereof, I have hereunto set my hand at Indianapolis, Indiana, this 18th day of August, A. D. one thousand nine hundred and twenty-five.

CHARLES DREXLER.